(12) United States Patent
Bala et al.

(10) Patent No.: US 11,290,026 B2
(45) Date of Patent: Mar. 29, 2022

(54) CONVERTER SYSTEM FOR POWERING AN ELECTRICAL LOAD

(71) Applicant: ABB Schweiz AG, Baden (CH)

(72) Inventors: Sandeep Bala, Raleigh, NC (US);
Arun Kumar Kadavelugu, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 47 days.

(21) Appl. No.: 16/658,911

(22) Filed: Oct. 21, 2019

(65) Prior Publication Data

US 2020/0052608 A1 Feb. 13, 2020

Related U.S. Application Data

(63) Continuation of application No. PCT/US2017/028917, filed on Apr. 21, 2017.

(51) Int. Cl.
*H02M 7/219* (2006.01)
*H02M 1/088* (2006.01)

(52) U.S. Cl.
CPC ........... *H02M 7/219* (2013.01); *H02M 1/088* (2013.01)

(58) Field of Classification Search
CPC ....... H02M 2/219; H02M 7/219; H02M 1/088
See application file for complete search history.

(56) References Cited

U.S. PATENT DOCUMENTS

| 6,462,518 | B1 | 10/2002 | Fischer et al. | |
|---|---|---|---|---|
| 9,590,494 | B1 | 3/2017 | Zhou et al. | |
| 2003/0099124 | A1* | 5/2003 | Meiners | H02M 5/14 363/148 |
| 2012/0212984 | A1* | 8/2012 | Yamada | H02M 7/219 363/89 |
| 2012/0262966 | A1* | 10/2012 | Luerkens | H02M 7/217 363/127 |
| 2013/0106328 | A1* | 5/2013 | Kopiness | H02M 1/36 318/400.11 |

(Continued)

FOREIGN PATENT DOCUMENTS

| CN | 1426150 A | 6/2003 |
|---|---|---|
| CN | 102687384 A | 9/2012 |

OTHER PUBLICATIONS

The State Intellectual Property Office of People's Republic of China, First Office Action issued in corresponding Chinese application No. 201780092387.X, dated Jan. 4, 2021, 17 pp.

(Continued)

*Primary Examiner* — Nguyen Tran
*Assistant Examiner* — Trinh Q Dang
(74) *Attorney, Agent, or Firm* — Greenberg Traurig, LLP (57) ABSTRACT

A converter system includes a DC bus for each phase of an input AC power signal; a first switching cell for each phase, including first two active switches coupled in series across the DC bus and forming a first switching cell AC pole therebetween, the first switching cell AC pole being coupled to a respective phase; and a second switching cell for each phase, including second two active switches coupled in series across the DC bus and forming a second switching cell AC pole therebetween. The second switching cell AC poles are coupled to each other to form a flying neutral. One of the (Continued)

first switching cell and the second switching cell switches at a frequency at least an order of magnitude greater than the line frequency. The other of the first switching cell and the second switching cell switches at a frequency approximately equal to the line frequency.

19 Claims, 9 Drawing Sheets

(56) References Cited

U.S. PATENT DOCUMENTS

| | | | | |
|---|---|---|---|---|
| 2014/0140112 | A1* | 5/2014 | Zhou | H02M 1/12 |
| | | | | 363/40 |
| 2014/0153294 | A1* | 6/2014 | Deboy | H02M 3/33569 |
| | | | | 363/21.04 |
| 2015/0171750 | A1* | 6/2015 | Zeng | H01L 27/0605 |
| | | | | 323/311 |
| 2016/0065056 | A1* | 3/2016 | Chen | H02M 1/4233 |
| | | | | 363/89 |
| 2016/0336873 | A1* | 11/2016 | Ayai | H02M 3/33576 |
| 2017/0110987 | A1* | 4/2017 | Ghosh | H02M 1/08 |
| 2017/0272023 | A1* | 9/2017 | Ahmed | H02M 5/4585 |

OTHER PUBLICATIONS

European Patent Office, Extended European Search Report issued in corresponding European application No. 17906086.8, dated Oct. 28, 2020, 14 pp.

Kim, Ho-Sung et al., The High-Efficiency Isolated AC-DC Converter Using the Three-Phase Interleaved LLC Resonant Converter Employing the Y-Connected Rectifier, IEEE Transactions on Power Electronics, vol. 29, No. 8, Aug. 2014, pp. 4017-4028.

Kim, Jung-Kyun et al., Analysis of Capacitor Voltage and Boost Vector in Neutral-Point-Clamped Converter and H-Bridge Converter, Proceedings of the 28th Annual Conference of the IEEE Industrial Electronics Society, Nov. 5-8, 2002, vol. 2, pp. 926-931.

Liu, Zhengyang et al., Digital-Based Interleaving Control for GaN-based MHz CRM Totem-pole PFC, IEEE Applied Power Electronics Conference and Exposition, Mar. 20, 2016, pp. 1847-1852.

Sfakianakis, Georgios E. et al., Overview of the Requirements and Implementations of Bidirectional Isolated AC-DC Converters for Automotive Battery Charging Applications, 2015 Tenth International Conference on Ecological Vehicles and Renewable Energies, Mar. 31, 2015, pp. 1-12.

Zhang, Baihua et al., Analysis and Reduction Method of Conducted Noise in GaN HEMTs based Totem-pole Bridgeless PFC Converter, 2016 IEEE 8th International Power Electronics and Motion Control Conference, May 22, 2016, pp. 274-278.

Zhang, Baihua et al., Conducted Noise Reduction of Totem-pole Bridgeless PFC Converter Using GaN HEMTs, 2015 IEEE International Telecommunications Energy Conference, Oct. 18, 2015, pp. 1-5.

European Communication pursuant to Article 94(3) EPC, issued by the European Patent Office regarding corresponding patent application Serial No. EP17906086.8; dated Oct. 18, 2021; 12 pages.

Xue Lingxiao, et al., "Bi-Directional PHEV Battery Charger Based on Normally-Off GaN-on-Si Multi-Chip Module"; 2014 IEEE Applied Power Electronics Conference and Exposition—APEC 2014, IEEE; Mar. 16, 2014; pp. 1662-1668.

* cited by examiner

CONVERTER SYSTEM FOR POWERING AN ELECTRICAL LOAD

TECHNICAL FIELD

The present application generally relates to electrical systems, and more particularly, but not exclusively, to a converter system for powering an electrical load.

BACKGROUND

Converter systems of various types, e.g., unity power factor converter systems, remain an area of interest. Some existing systems have various shortcomings, drawbacks and disadvantages relative to certain applications. For example, in some converter systems, switching speed may not be fast enough to achieve desired size and weight goals. Accordingly, there remains a need for further contributions in this area of technology.

SUMMARY

One embodiment of the present invention is a unique converter system. Another embodiment is unique converter system. Another embodiment is a unique converter system. Other embodiments include apparatuses, systems, devices, hardware, methods, and combinations for converter systems. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
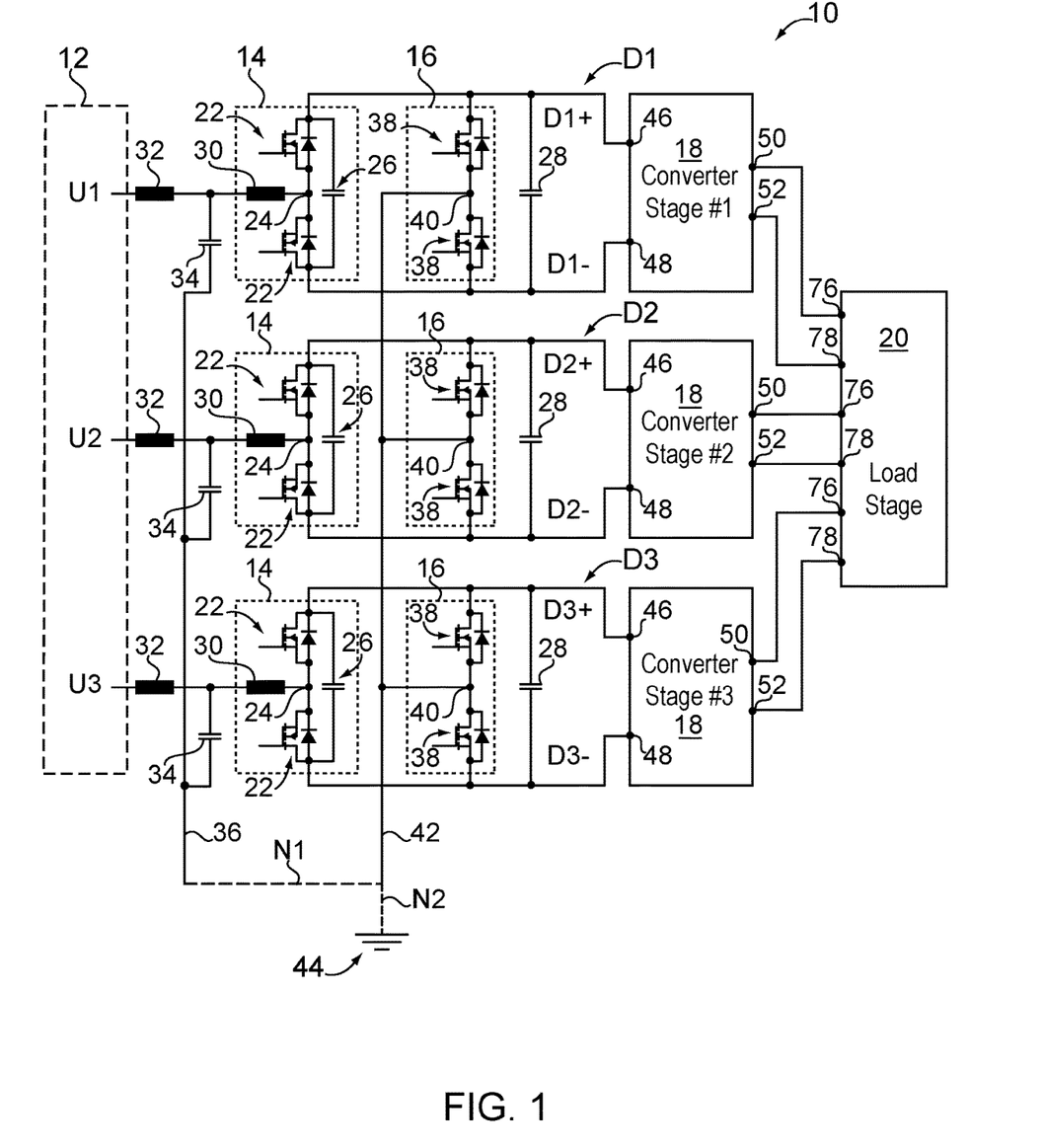
FIG. 1 schematically illustrates a plan view of some aspects of a non-limiting example of a converter system in accordance with an embodiment of the present invention.

Referring to FIG. 1, some aspects of a non-limiting example of a converter system 10 in accordance with an embodiment of the present invention is schematically illustrated. Converter system 10 is an isolated 3-phase converter system. In one form, converter system 10 is an electric vehicle charger or other power supply. In other embodiments, converter system 10 may take other forms. For example, converter system 10 may be configured to power an electric motor, e.g., a three-phase electric motor. In some embodiments, converter system 10 provides power factor correction, e.g., unity power factor at the output. In one form, input voltage is nominally 380/480 line-line/rms VAC. In other embodiments, other input values may be employed. In one form, output is nominally 50-1000 VDC. In other embodiments, output voltage may vary with the needs of the application. In one form, output power is in the range of 10-50 kW. In other embodiments, output power may vary with the needs of the application.

Converter system 10 is coupled to a three-phase AC (alternating current) power source 12 having phases U1, U2, U3 at a line frequency, e.g., 50 Hz or 60 Hz. Converter system 10 includes a DC (direct current) bus D1, D2, D3 for each respective phase U1, U2, U3. Each DC bus has positive rails D1+, D2+, D3+ and negative rails D1−, D2−, D3−. Converter system 10 includes, for each phase U1, U2, U3 of AC power source 12, a high frequency switching cell 14, a low frequency switching cell 16, each of which are configured to convert AC to DC, and a converter stage 18 configured to convert DC to AC. In other embodiments, the number of converter cells and stages may vary with the needs of the application. Converter system 10 includes a load stage 20, which in some embodiments converts the AC output of converter stages 18 to DC for powering a DC load, whereas in other embodiments, the load stage powers an AC load.

High frequency cells 14 include at least two high frequency active switches 22 coupled in series across DC buses D1, D2 and D3 forming an AC pole 24 therebetween. The term, "active" indicates that the switches are controlled switches, e.g., controlled via gate drive signals, as opposed to being passive switches, e.g., diodes alone. In order to reduce the size of the input filters (especially the magnetics—inductors and transformers) in the converter system 10, it is desirable to use transistors that can switch at higher frequencies. GaN (gallium nitride) transistors can switch at >3× the frequency of equivalent Si (silicon) transistors, especially IGBTs (insulated-gate bipolar transistors), which is the most common device used at the proposed power levels (e.g., at or above 10 kW). However, GaN devices are typically rated only for 650V or below, which may be insufficient for use in conventional bridge circuits with 380V or higher 3-phase AC input. Another consideration is that GaN devices switch extremely fast, and it is important to have short power loops, which is easier to achieve with 2-level switching cells, than with multi-level switching cells. Accordingly, in one form, high frequency active switches 22 are GaN devices. In other embodiments, high frequency active switches 22 may employ or be formed of other materials, e.g., SiC (silicon carbide). In one form, high frequency active switches 22 are GaN MOSFETs. In other embodiments, high frequency active switches 22 may take other forms, e.g., GaN HEMTs (high electron mobility transistors) or IGBTs. In some embodiments, high frequency active switches 22 may be SiC MOSFETs (silicon carbide metal oxide semiconductor field effect transistors). High frequency active switches 22 are operative to switch at a frequency at least an order of magnitude greater than line frequency in order to convert AC to DC. In one form, high frequency active switches 22 are operative to switch at a frequency in the range of 20 kHz to 200 kHz, and in some embodiments greater than 200 kHz or less than 20 kHz.

Coupled directly across active switches 22 are decoupling capacitors 26. Decoupling capacitors 26 are operative to filter out high frequency signals. Decoupling capacitors 26 are not coupled across the DC buses D1, D2, D3, but rather are coupled directly across active switches 22 themselves in order to limit the length of the loop formed by the two high frequency active switches and decoupling capacitors 26. For each phase, a bulk DC link capacitor 28 is coupled across DC buses D1, D2, D3 in order to limit overall voltage ripple on the DC links D1, D2, D3. The energy storage requirement for decoupling capacitors 26 is typically small in comparison to bulk DC link capacitor 28.

AC pole 24 for each switching cell 14 is coupled to a respective phase U1, U2, U3 of AC power source 12. In one form, an inductor 30 coupled to each AC pole 24. Each phase leg U1, U2, U3 is coupled to an inductor 32. Inductors 30 and 32 are coupled to each other for each phase U1, U2, U3. For each phase, a capacitor 34 is coupled to the midpoint between inductors 30 and 32 at one end and forms a filter neutral 36 at the other end. Filter neutral 36 is coupled to the capacitor 34 for each phase.

Figure 2:
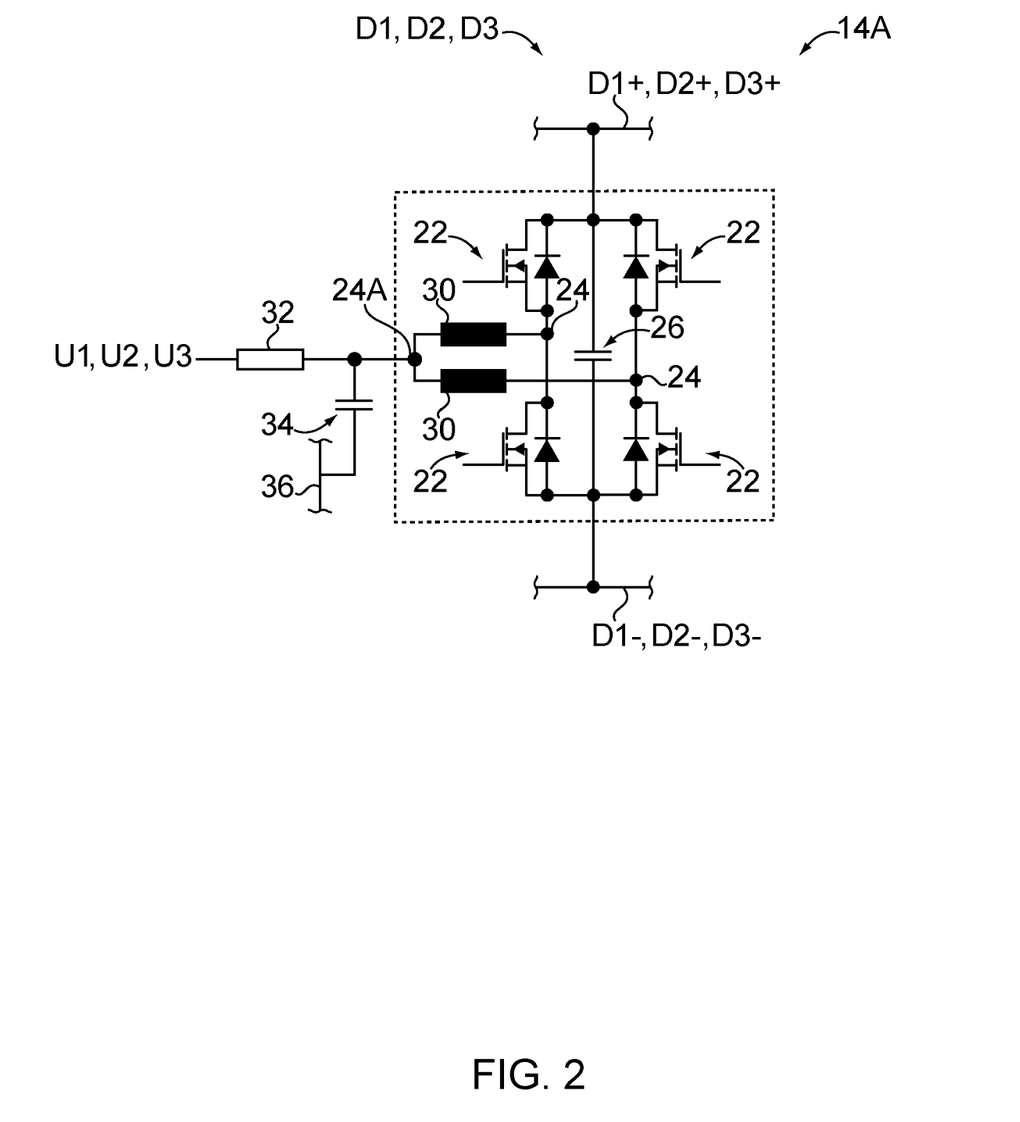
FIG. 2 schematically illustrates some aspects of a non-limiting example of an alternate high frequency switching cell in accordance with an embodiment of the present invention.

Referring to FIG. 2, in another embodiment, the high frequency switching cell may take the form of an interleaved switching cell 14A. Interleaved switching cell 14A has four (4) high frequency active switches 22 coupled in series across DC buses D1, D2, D3. AC poles 24 are coupled to inductors 30, which are coupled together at a common AC pole 24A. Common AC pole 24A is coupled to each phase U1, U2, U3 via inductor 32. In another embodiment, inductors 30 may be inversely coupled.

Referring again to FIG. 1, low frequency cells 16 include at least two low frequency active switches 38 coupled in series across DC buses D1, D2 and D3, forming an AC pole 40 therebetween. The AC poles 40 for each phase U1, U2, U3 are coupled together to form a flying neutral 42. In some embodiments, flying neutral 42 may be coupled to filter neutral 36, e.g., as indicated by dashed line N1. In some embodiments, flying neutral 42 may also or alternatively be coupled to a chassis ground 44, e.g., a chassis for converter system 10, for example, as indicated by dashed line N2.

In one form, low frequency active switches 38 are Si MOSFETs. In other embodiments, low frequency active switches 38 may take other forms, e.g., Si HEMTs (high electron mobility transistors) or IGBTs. Low frequency active switches 38 are operative to switch at line frequency or approximately line frequency, e.g., 50 Hz or 60 Hz to convert AC to DC.

Figure 3:
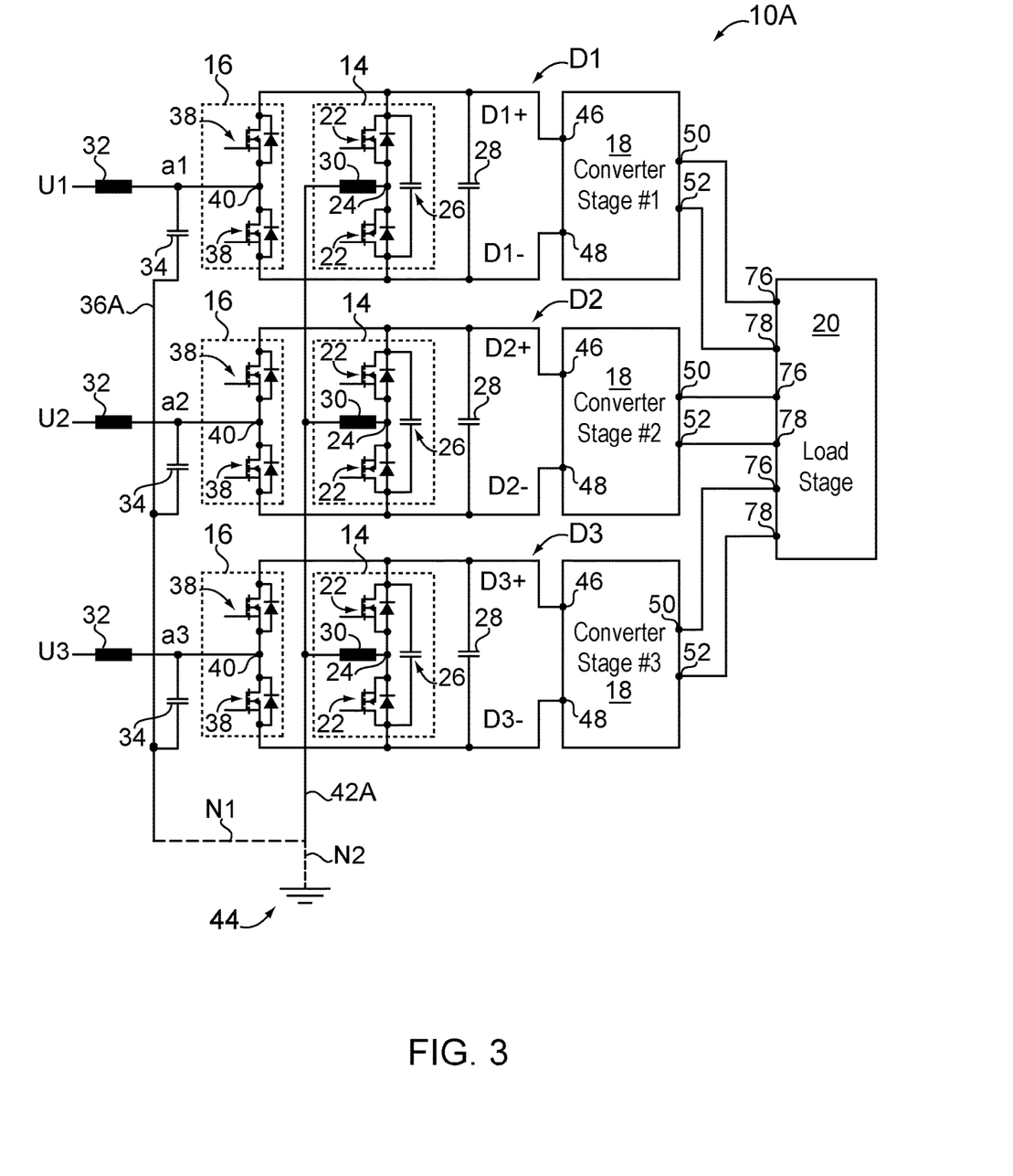
FIG. 3 schematically illustrates some aspects of a non-limiting example of a converter system in accordance with an embodiment of the present invention.

Referring to FIG. 3, some aspects of a non-limiting example of a converter system 10A in accordance with an embodiment of the present invention is schematically illustrated. Converter system 10A is similar to converter system 10 described above and illustrated in FIG. 1, except that the connections between the high frequency cells 14 and low frequency cells 16 have been swapped. In the embodiment of FIG. 3, AC poles 24 of high frequency cells 14 for each phase U1, U2, U3 are coupled to each other via inductors 30 to form flying neutral 42A. In some embodiments, flying neutral 42A may be coupled to filter neutral 36, e.g., as indicated by dashed line N1. In some embodiments, flying neutral 42A may also or alternatively be coupled to chassis ground 44, for example, as indicated by dashed line N2.

Referring again to FIG. 1, converter stage 18 converts the DC output at each DC bus D1, D2, D3 to AC. In one form, a single converter stage 18 is employed is employed for each phase U1, U2, U3. In other embodiments, a plurality of converter stages may be employed for each phase U1, U2, U3. In some embodiments, the output of each converter stage may be used to feed separate loads, or to provide isolated inputs to a multi-input load, e.g., depending upon the embodiment. Each converter stage has two (2) DC terminals 46, 48 as input (DC input) and two (2) AC terminals 50, 52 as output (AC output). Terminal 46 corresponds to the positive DC rail D1+, D2+, D3+ of DC bus D1, D2, D3; and terminal 48 corresponds to the negative DC rail D1−, D2−, D3− of DC bus D1, D2, D3. Each converter stage 18 includes a high frequency switching cell 54 having at least two active switches 56 (FIGS. 4-11) coupled in series across the DC bus D1, D2, D3, e.g., at terminals 46, 48. In various embodiments, the active switches may be GaN devices or SiC devices, e.g., MOSFETs, HEMTs or IGBTs.

The AC output of converter stages 18 has a high frequency component because the active switches of converter stages 18 perform switching at a high frequency. In one form, the switching frequency of active switches 56 in converter stage 18 is at least three orders of magnitude greater than the line frequency, although lower frequencies may be employed in some embodiments. In some embodiments, the switching frequency may be in the range of 100 kHz to 1 MHz. In other embodiments, the switching frequency of active switches 56 in converter stages 18 may exceed 1 MHz, or may be less than 100 kHz. Below are described some of the potential various alternative embodiments of converter stages 18, referred to as converter stages 18A-18H.

Figure 4:
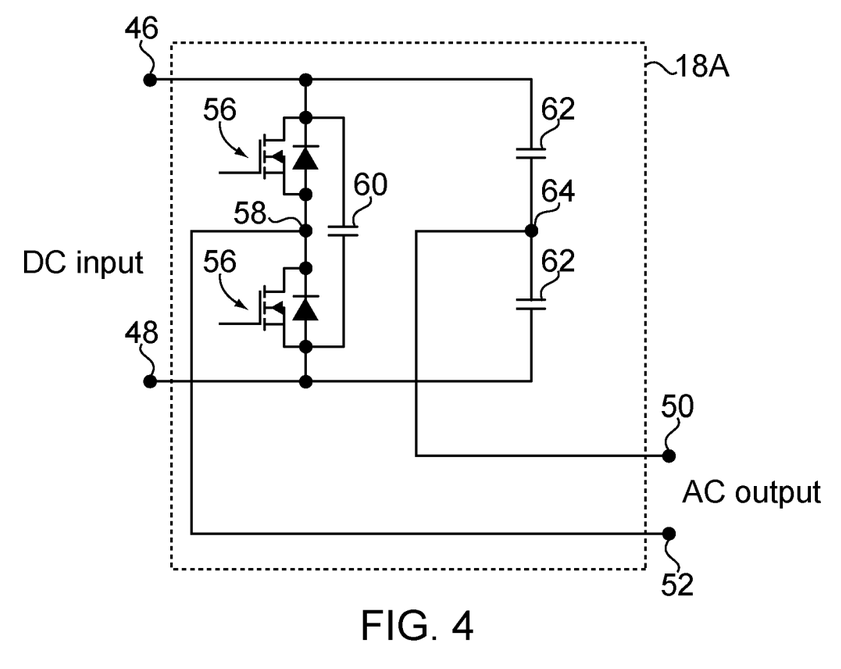
FIG. 4 schematically illustrates some aspects of a non-limiting example of a DC/AC converter stage of a converter system in accordance with an embodiment of the present invention.

Referring to FIG. 4, some aspects of a non-limiting example of a converter stage 18A in accordance with an embodiment of the present invention are schematically illustrated. In the embodiment of FIG. 4, converter stage 18A is in the form of a half bridge. Converter stage 18A may be used, for example, in single active bridge configurations or dual active bridge configurations. Converter stage 18A includes active switches 56 coupled in series across DC buses D1, D2, D3, i.e., at DC terminals 46, 48, forming an AC pole 58 therebetween, which is coupled to AC terminal 52. A decoupling capacitor 60 is coupled directly across switches 56. Coupled in parallel to switches 56 are capacitors 62, which form an AC pole 64 therebetween. AC pole 64 is coupled to AC terminal 50.

Figure 5:
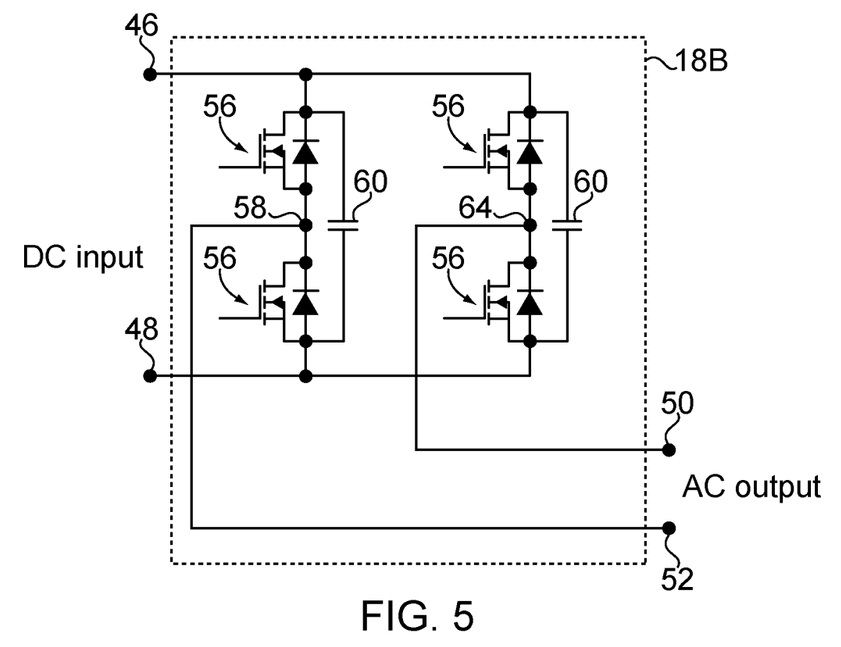
FIG. 5 schematically illustrates some aspects of a non-limiting example of a DC/AC converter stage of a converter system in accordance with an embodiment of the present invention.

Referring to FIG. 5, some aspects of a non-limiting example of a converter stage 18B in accordance with an embodiment of the present invention are schematically illustrated. In the embodiment of FIG. 5, converter stage 18B is in the form of a full bridge. Converter stage 18B may be used, for example, in single active bridge configurations or dual active bridge configurations. Converter stage 18B includes two (2) parallel pairs of active switches 56 coupled in series across DC buses D1, D2, D3, i.e., at DC terminals 46, 48, forming AC poles 58 and 64 therebetween, which are coupled to respective AC terminals 52 and 50. Decoupling capacitors 60 are coupled directly across switches 56.

Figure 6:
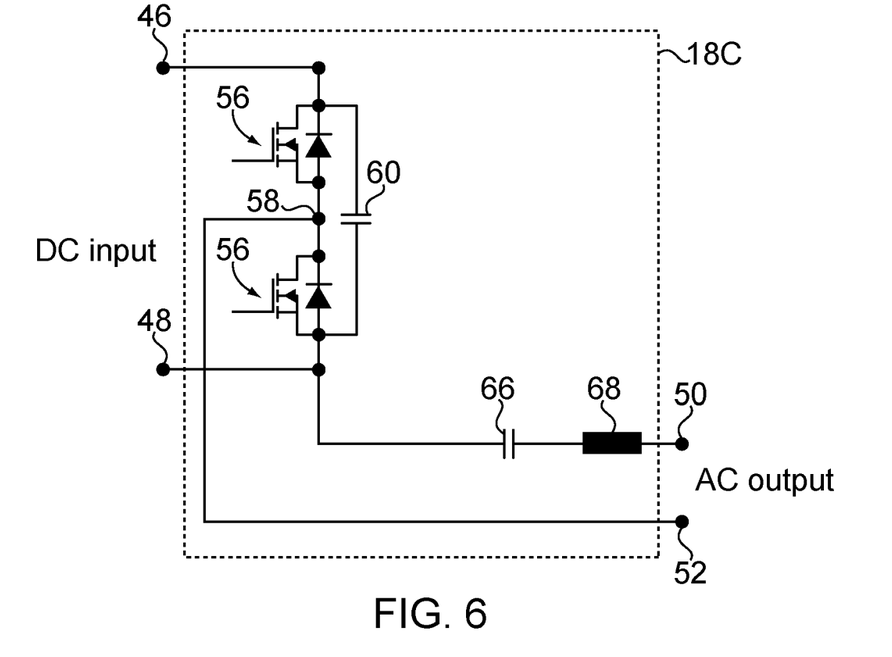
FIG. 6 schematically illustrates some aspects of a non-limiting example of a DC/AC converter stage of a converter system in accordance with an embodiment of the present invention.

Referring to FIG. 6, some aspects of a non-limiting example of a converter stage 18C in accordance with an embodiment of the present invention are schematically illustrated. In the embodiment of FIG. 6, converter stage 18C is in the form of a half bridge+LC (inductor, capacitor) (tied to endpoint, e.g., LC tied to DC terminal 48). Converter stage 18C may be used, for example, in an LLC converter. Converter stage 18C includes active switches 56 coupled in series across DC buses D1, D2, D3, i.e., at DC terminals 46, 48, forming an AC pole 58 therebetween, which is coupled to AC terminal 52. A decoupling capacitor 60 is coupled directly across switches 56. A capacitor 66 and an inductor 68 are coupled in series between DC terminal 48 and AC terminal 50. In some embodiments, capacitor 66 and inductor 68 may alternatively be coupled in series between AC pole 58 and AC terminal 52.

Figure 7:
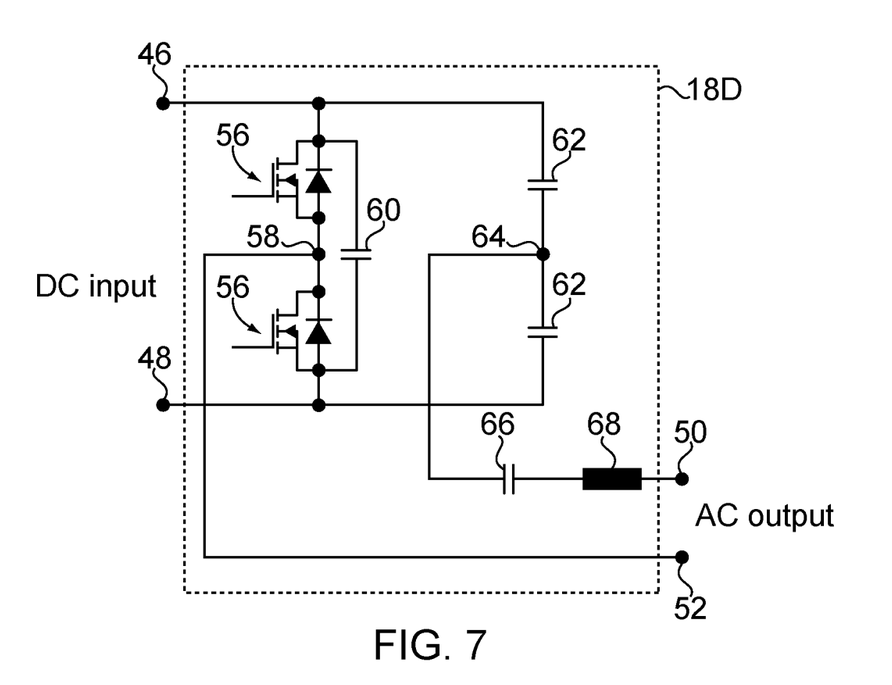
FIG. 7 schematically illustrates some aspects of a non-limiting example of a DC/AC converter stage of a converter system in accordance with an embodiment of the present invention.

Referring to FIG. 7, some aspects of a non-limiting example of a converter stage 18D in accordance with an embodiment of the present invention are schematically illustrated. In the embodiment of FIG. 7, converter stage 18D is in the form of a half bridge+LC (tied to midpoint, e.g., LC tied to AC pole 64). Converter stage 18D may be used, for example, in an LLC converter. Converter stage 18D includes active switches 56 coupled in series across DC buses D1, D2, D3, i.e., at DC terminals 46, 48, forming AC pole 58 therebetween. AC pole 58 is coupled to AC terminal 52. A decoupling capacitor 60 is coupled directly across switches 56. Coupled in parallel to switches 56 are capacitors 62, which form AC pole 64 therebetween. AC pole 64 is coupled to AC terminal 50 via capacitor 66 and inductor 68, coupled in series. In some embodiments, capacitor 66 and inductor 68 may alternatively be coupled in series between AC pole 58 and AC terminal 52.

Figure 8:
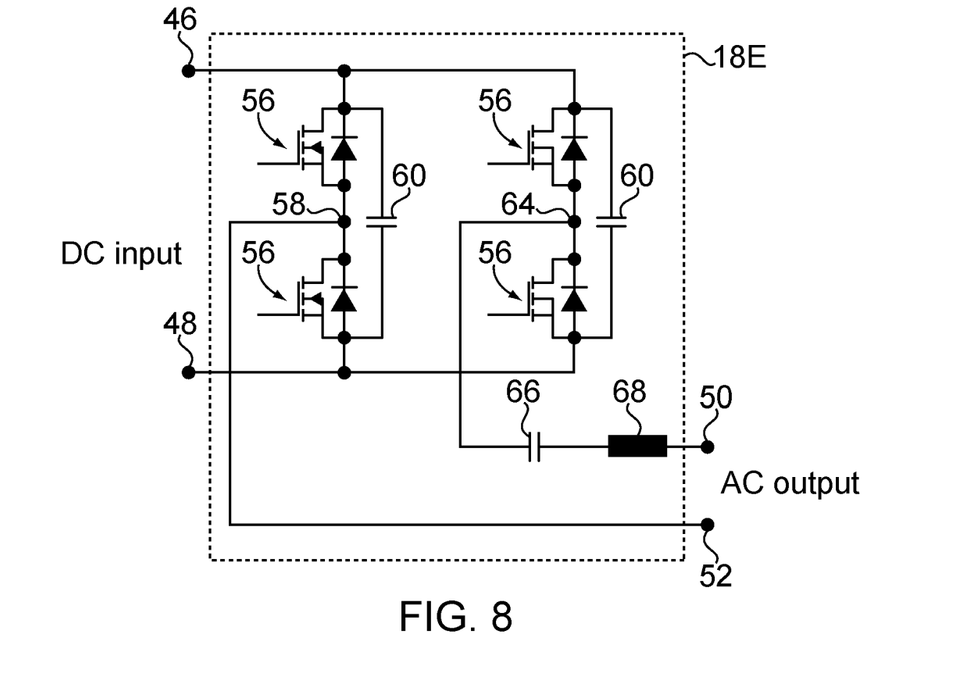
FIG. 8 schematically illustrates some aspects of a non-limiting example of a DC/AC converter stage of a converter system in accordance with an embodiment of the present invention.

Referring to FIG. 8, some aspects of a non-limiting example of a converter stage 18E in accordance with an embodiment of the present invention are schematically illustrated. In the embodiment of FIG. 8, converter stage 18E is in the form of a full bridge+LC, and may be used, for example, in an LLC converter. Converter stage 18E includes two (2) parallel pairs of active switches 56 coupled in series across DC buses D1, D2, D3, i.e., at DC terminals 46, 48, forming AC poles 58 and 64 therebetween. Decoupling capacitors 60 are coupled directly across switches 56. AC pole 58 is coupled to AC terminal 52. AC pole 64 is coupled to AC terminal 50 via capacitor 66 and inductor 68, coupled in series. In some embodiments, capacitor 66 and inductor 68 may alternatively be coupled in series between AC pole 58 and AC terminal 52.

Figure 9:
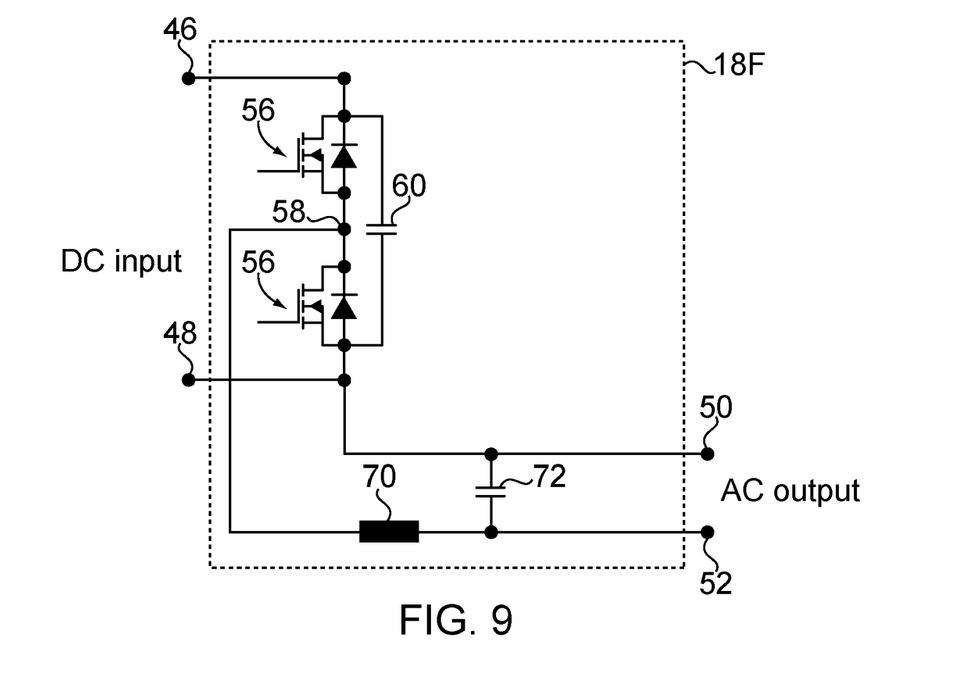
FIG. 9 schematically illustrates some aspects of a non-limiting example of a DC/AC converter stage of a converter system in accordance with an embodiment of the present invention.

Referring to FIG. 9, some aspects of a non-limiting example of a converter stage 18F in accordance with an embodiment of the present invention are schematically illustrated. In the embodiment of FIG. 9, converter stage 18F is in the form of a half bridge+parallel resonant LC (tied to endpoint, e.g., capacitor 72 tied to DC terminal 48). Converter stage 18F may be used, for example, in a parallel resonant converter. Converter stage 18F includes active switches 56 coupled in series across DC buses D1, D2, D3, i.e., at DC terminals 46, 48, forming an AC pole 58 therebetween. AC pole 58 is coupled to AC terminal 52 via an inductor 70. A decoupling capacitor 60 is coupled directly across switches 56. Capacitor 72 is coupled across AC terminals 50, 52.

Figure 10:
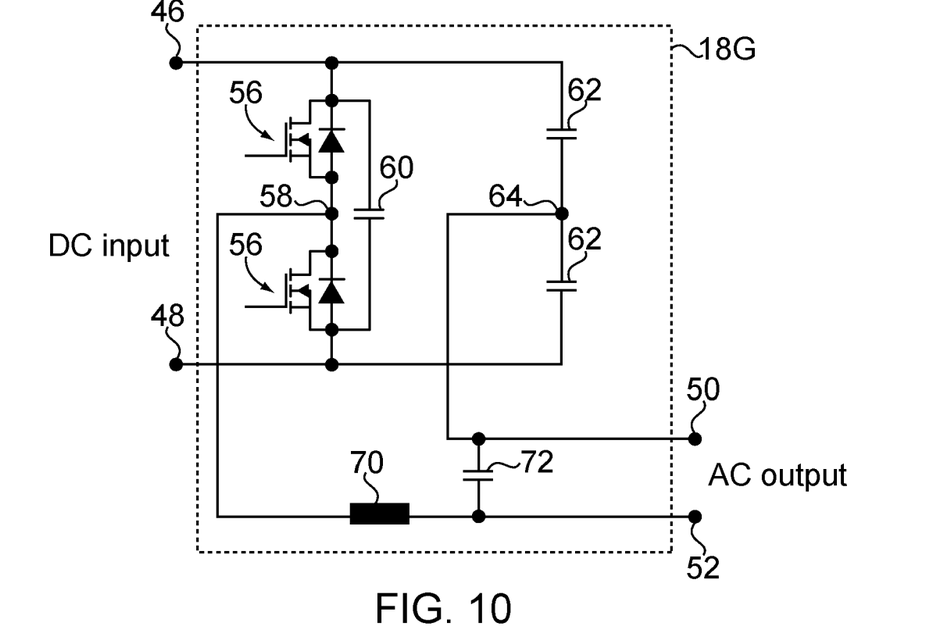
FIG. 10 schematically illustrates some aspects of a non-limiting example of a DC/AC converter stage of a converter system in accordance with an embodiment of the present invention.

Referring to FIG. 10, some aspects of a non-limiting example of a converter stage 18G in accordance with an embodiment of the present invention are schematically illustrated. In the embodiment of FIG. 10, converter stage 18G is in the form of a half bridge+parallel resonant LC (tied to midpoint, e.g., capacitor 72 tied to AC pole 64). Converter stage 18G may be used, for example, in a parallel resonant converter. Converter stage 18G includes active switches 56 coupled in series across DC buses D1, D2, D3, i.e., at DC terminals 46, 48, forming AC pole 58 therebetween. AC pole 58 is coupled to AC terminal 52 via inductor 70. A decoupling capacitor 60 is coupled directly across switches 56. Coupled in parallel to switches 56 are capacitors 62, which form AC pole 64 therebetween. AC pole 64 is coupled to AC terminal 50. Capacitor 72 is coupled across AC terminals 50, 52.

Figure 11:
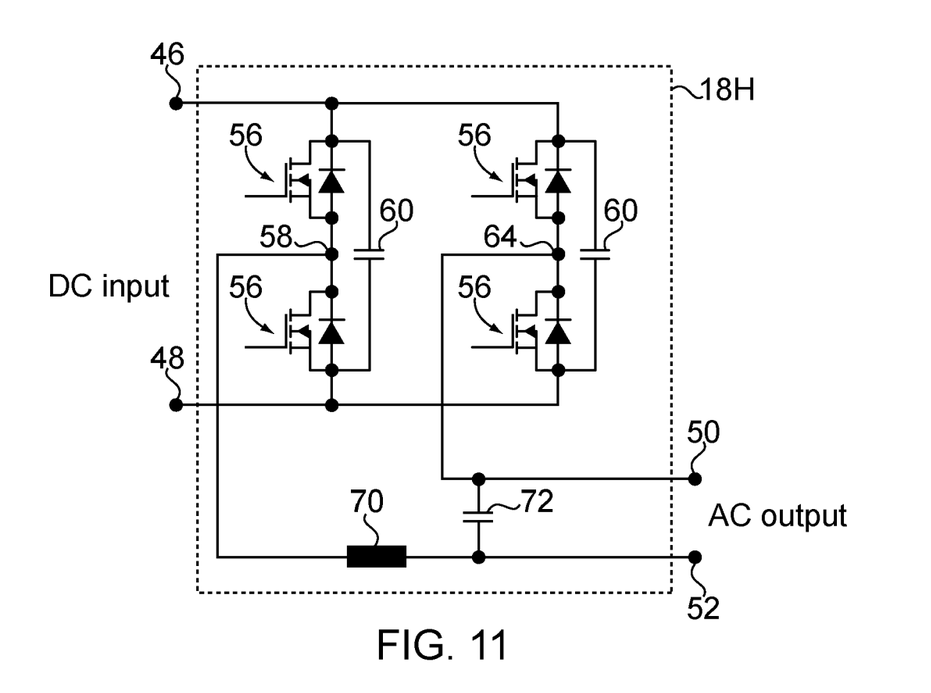
FIG. 11 schematically illustrates some aspects of a non-limiting example of a DC/AC converter stage of a converter system in accordance with an embodiment of the present invention.

Referring to FIG. 11, some aspects of a non-limiting example of a converter stage 18H in accordance with an embodiment of the present invention are schematically illustrated. In the embodiment of FIG. 11, converter stage 18H is in the form of a full bridge+parallel resonant LC. Converter stage 18H may be used, for example, in a parallel resonant converter. Converter stage 18H includes two (2) parallel pairs of active switches 56 coupled in series across DC buses D1, D2, D3, i.e., at DC terminals 46, 48, forming AC poles 58 and 64 therebetween. Decoupling capacitors 60 are coupled directly across switches 56. AC pole 58 is coupled to AC terminal 52 via inductor 70. AC pole 64 is coupled to AC terminal 50. Capacitor 72 is coupled across AC terminals 50, 52.

Referring again to FIG. 1, load stage 20 receives as input the AC power output by each converter stage 18, i.e., from AC terminals 50, 52 for each phase U1, U2, U3. Load stage 20 includes, for AC input, AC terminals 76, 78, which are coupled to respective AC terminals 50, 52 of converter stages 18. Depending on the embodiment, load stage 20 is operative to convert the AC output by converter stages 18 to DC to power a DC load, e.g., to charge an electric vehicle battery or power some other DC load, or to provide AC power to an AC load, such as a motor or other electrical machine. Below are described some of the potential various alternative embodiments of load stages 20, referred to below as load stages 20A-20D.

Figure 12:
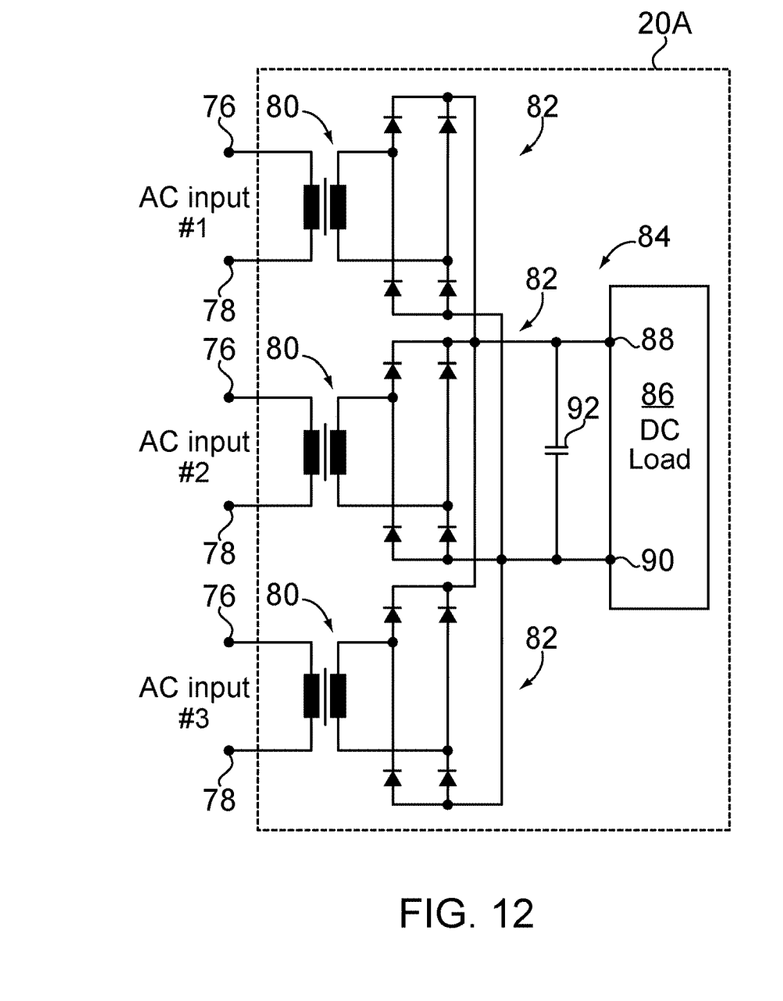
FIG. 12 schematically illustrates some aspects of a non-limiting example of a load stage of a converter system in accordance with an embodiment of the present invention.

Referring to FIG. 12, some aspects of a non-limiting example of a load stage 20A in accordance with an embodiment of the present invention are schematically illustrated. In the embodiment of FIG. 12, load stage 20A is in the form of three (3) single-phase transformers 80, one for each phase U1, U2, U3; and three single-phase rectifiers 82, one coupled to each transformer 80, wherein rectifiers 82 rectify AC to DC for each phase U1, U2, U3. Load stage 20A may be used, for example, in or in conjunction with single active bridge, parallel resonant or LLC converters (e.g., converter stages 18). The output of rectifiers 82 is supplied to an output DC bus 84 which supplies power to DC load 86 via DC terminals 88, 90. A DC link capacitor 92 is coupled across DC bus 84 in order to limit voltage ripple in DC bus 84. In one form, DC load 86 is an electric vehicle, i.e., an electric vehicle battery. In other embodiments, DC load 86 may be any DC load.

Figure 13:
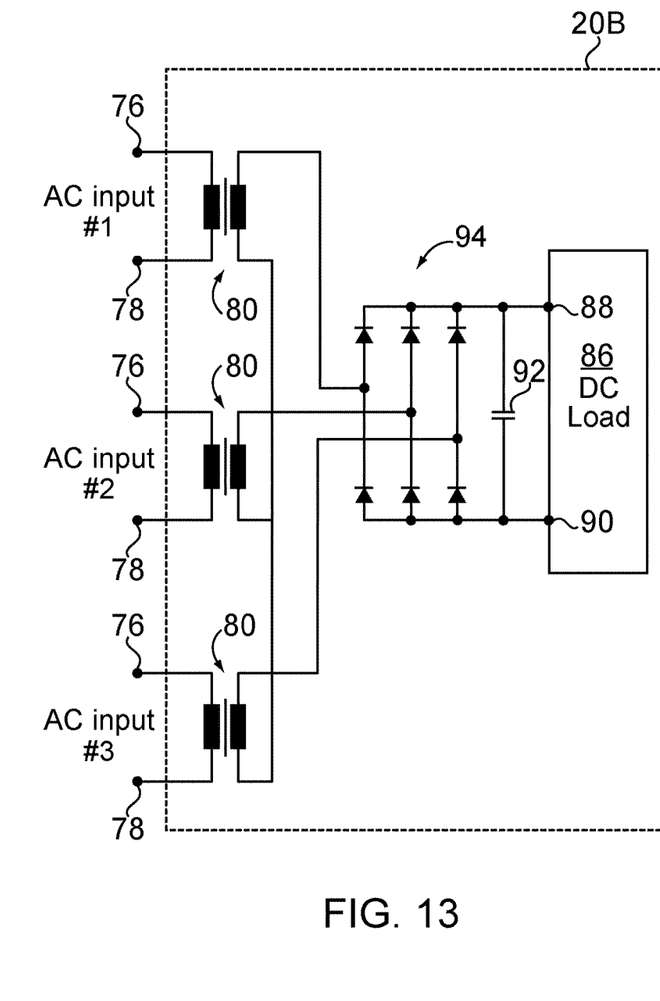
FIG. 13 schematically illustrates some aspects of a non-limiting example of a load stage of a converter system in accordance with an embodiment of the present invention.

Referring to FIG. 13, some aspects of a non-limiting example of a load stage 20B in accordance with an embodiment of the present invention are schematically illustrated. In the embodiment of FIG. 12, load stage 20B is in the form of three (3) single-phase transformers 80 in a wye connection, one for each phase U1, U2, U3; and a three-phase rectifier 94 coupled to transformers 80. Load stage 20B may be used, for example, in or in conjunction with single active bridge, parallel resonant or LLC converters (e.g., converter stages 18). The output of rectifier 94 is supplied to an output DC bus 84 which supplies power to DC load 86 via DC terminals 88, 90. DC link capacitor 92 is coupled across DC bus 84 in order to limit voltage ripple in DC bus 84.

Figure 14:
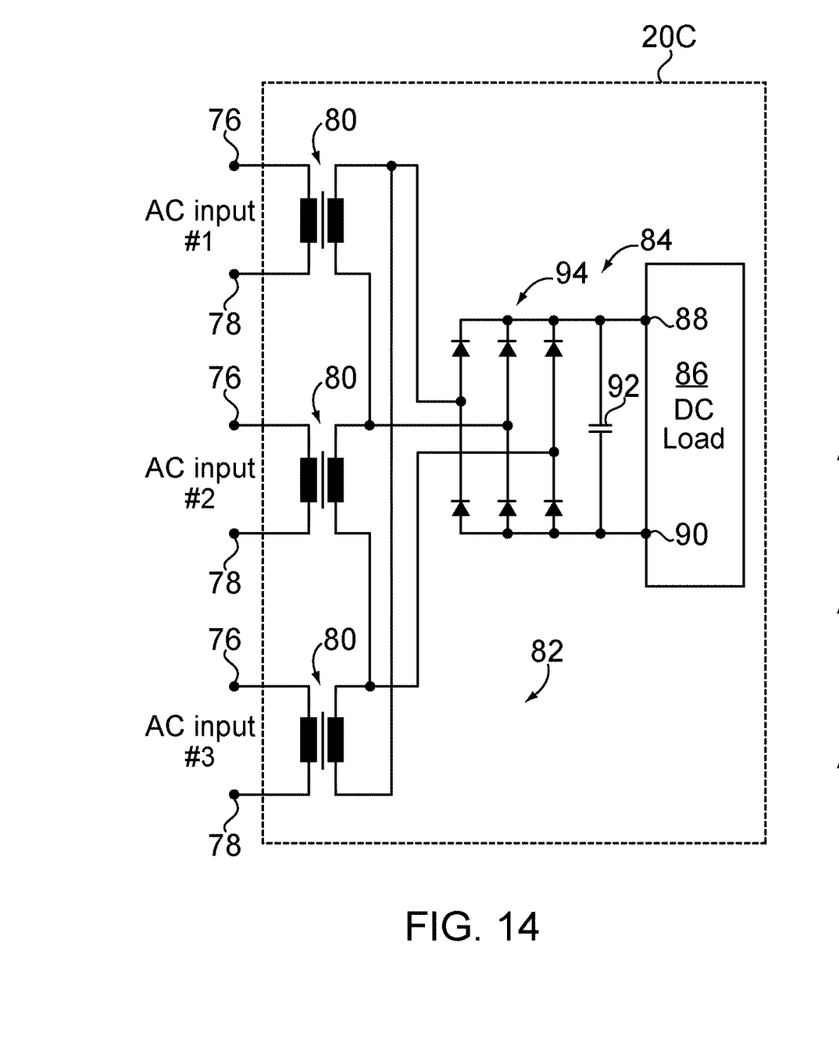
FIG. 14 schematically illustrates some aspects of a non-limiting example of a load stage of a converter system in accordance with an embodiment of the present invention.

Referring to FIG. 14, some aspects of a non-limiting example of a load stage 20C in accordance with an embodiment of the present invention are schematically illustrated. In the embodiment of FIG. 14, load stage 20C is in the form of three (3) single-phase transformers 80 in a delta connection, one for each phase U1, U2, U3; and a three-phase rectifier 94 coupled to transformers 80. Load stage 20C may be used, for example, in or in conjunction with single active bridge, parallel resonant or LLC converters (e.g., converter stages 18). The output of rectifier 94 is supplied to an output DC bus 84 which supplies power to DC load 86 via DC terminals 88, 90. DC link capacitor 92 is coupled across DC bus 84 in order to limit voltage ripple in DC bus 84.

In each of FIGS. 12, 13, and 14, the diodes in the rectifiers may be replaced by active switches (e.g., MOSFETs or IGBTs). In some embodiments, an inductor may be positioned between each bridge 94 (or 82) and capacitor 92.

Figure 15:
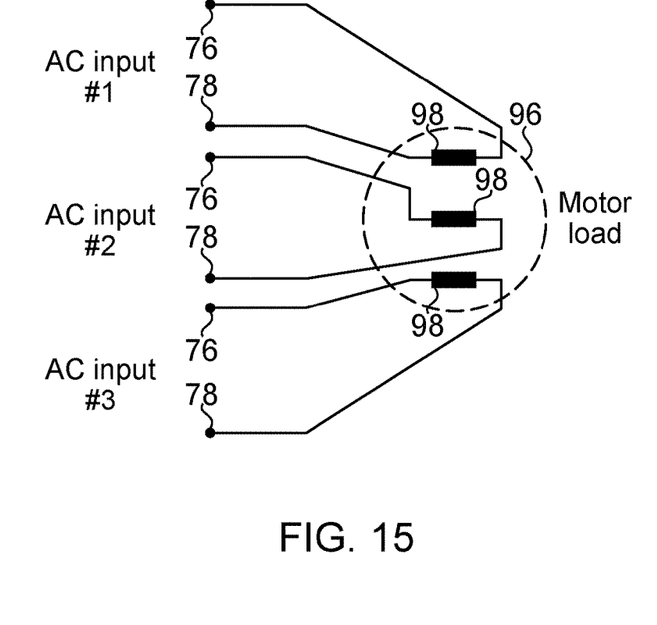
FIG. 15 schematically illustrates some aspects of a non-limiting example of a load stage of a converter system in accordance with an embodiment of the present invention.

Referring to FIG. 15, some aspects of a non-limiting example of a load stage 20D in accordance with an embodiment of the present invention are schematically illustrated. In the embodiment of FIG. 15, the load is a motor, e.g., a three-phase motor 96 having three (3) groups of windings 98. Each group of windings 98 is coupled to AC terminals 76, 78 for one of the phases U1, U2, U3 (AC input #1, AC input #2, AC input #3). In other embodiments, the load may be another type of three-phase electrical load.

Embodiments of the present invention include a converter system for converting a multi-phase AC power signal having one or more phases at a line frequency from an AC power source to a DC power signal for powering a load, comprising: a DC bus for each phase of the AC power signal; a first switching cell for each phase of the AC power signal, each first switching cell including first two active switches coupled in series across the DC bus and forming a first switching cell AC pole therebetween, the first switching cell AC pole being coupled to a respective phase of the AC power source; and a second switching cell for each phase of the AC power signal, each second switching cell including second two active switches coupled in series across the DC bus and forming a second switching cell AC pole therebetween, wherein the second switching cell AC poles are coupled to each other to form a flying neutral, wherein one of the first switching cell and the second switching cell is operative to switch at a first frequency at least an order of magnitude greater than the line frequency to convert AC to DC; and wherein the other of the first switching cell and the second switching cell is operative to switch at a second frequency approximately equal to the line frequency to convert AC to DC.

In a refinement, the first frequency is within or exceeds a range of 20 kHz to 200 kHz.

In another refinement, the first two active switches and/or the second two active switches are gallium nitride (GaN) devices.

In yet another refinement, the converter system further comprises a transformer for each phase; a third switching cell for each phase of the AC power signal, each third switching cell including third two active switches coupled in series across the DC bus and forming a third switching cell AC pole therebetween, wherein the third switching cell AC pole is coupled to the transformer for each phase; and wherein the third switching cells are operative to switch at a third frequency at least three orders of magnitude greater than the line frequency to convert DC to AC; and a rectifier operative to rectify AC to DC for each phase.

In still another refinement, the third frequency is within or exceeds a range of 100 kHz to 1 MHz.

In yet still another refinement, the converter system further comprises a filter neutral coupled to each phase of the AC power source via a capacitor.

In a further refinement, for each phase, two inductors are coupled in series between the first switching cell AC pole and the AC power source; and the capacitor is coupled between the two inductors.

In a yet further refinement, the flying neutral is coupled to the filter neutral.

In a still further refinement, the converter system further comprises a chassis ground, wherein the flying neutral is coupled to the chassis ground.

In a yet still further refinement, the second switching cell AC poles are coupled directly to each other without any intervening inductors or capacitors to form the flying neutral.

In another further refinement, the converter system further comprises decoupling capacitors coupled directly across the first two active switches and operative to filter out high frequency signals; and a bulk DC link capacitor coupled across the DC bus and operative to limit voltage ripple across the DC bus.

Embodiments of the present invention include a converter system for converting a multi-phase AC power signal having one or more phases at a line frequency from an AC power source to a desired power signal for powering a load, comprising: a DC bus for each phase of the AC power signal; a first at least two switching cells, each switching cell of the first at least two switching cells including a first at least two active switches coupled in series across the DC bus; a first AC pole formed between the first at least two active switches; a decoupling capacitor coupled directly across the first at least two active switches coupled in series; and an inductor coupled between the first AC pole and the AC power source for each phase; and a second at least two switching cells, each switching cell of the second at least two switching cells including a second at least two active switches coupled in series across the DC bus; and a second AC pole formed between the second at least two active switches, wherein the second AC poles for each of the second at least two switching cells are coupled together and form a flying neutral, wherein the first at least two switching cells are operative to switch at a first frequency at least an order of magnitude greater than the line frequency to convert AC to DC; and wherein the second at least two switching cells are operative to switch at a second frequency approximately equal to the line frequency to convert AC to DC.

In a refinement, the converter system further comprises a converter stage coupled to the DC bus for each phase of the AC power signal and operative to convert DC to AC.

In another refinement, the converter stage is a half bridge converter.

In yet another refinement, the converter stage is a full bridge converter.

In a still another refinement, the converter stage includes an AC output terminal; and wherein the converter stage includes a capacitor in series with an inductor on the AC output terminal.

In a yet still another refinement, the converter stage is a parallel resonant converter.

In a further refinement, the converter system further comprises a single-phase transformer and a single-phase rectifier for each phase.

In a yet further refinement, the one or more phases is three-phases, further comprising three (3) single-phase transformers in a wye connection or a delta connection, and a three-phase rectifier coupled to the transformers.

In a still further refinement, the load is a motor.

Embodiments of the present invention include a converter system for converting a three-phase AC power signal from an AC power source to a desired power signal for powering a load, comprising: a DC bus for each phase of the AC power signal; means for converting AC to DC at a first frequency at least an order of magnitude greater than the line frequency; and means for converting AC to DC at a second frequency approximately equal to the line frequency.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A converter system for converting an AC power signal having one or more phases at a line frequency from an AC power source to a DC power signal for powering a load, comprising:
   a DC bus for each phase of the AC power signal;
   a first switching cell for each phase of the AC power signal, each first switching cell including a first pair of active switches coupled in series across the DC bus and a second pair of active switches coupled in series across the DC bus, the first and second pairs of active switches each having a first switching cell AC pole therebetween, the first switch cell AC pole of the first pair of active switches being coupled to a first inductor, and the first switch cell AC pole of the second pair of active switches being coupled to a second inductor, the first and second inductors being coupled together at a common AC pole, the common AC pole being coupled via a third inductor to a respective phase of the AC power source; and
   a second switching cell for each phase of the AC power signal, each second switching cell including second two active switches coupled in series across the DC bus and forming a second switching cell AC pole therebetween, wherein the second switching cell AC poles are coupled to each other to form a flying neutral,
   wherein the first switching cell is operative to switch at a first frequency at least an order of magnitude greater than the line frequency to convert AC to DC;
   wherein the second switching cell is operative to switch at a second frequency approximately equal to the line frequency to convert AC to DC,
   wherein each first switching cell further includes decoupling capacitors coupled directly across each active switch of the first and second pairs of active switches and operative to filter out high frequency signals; and a bulk DC link capacitor coupled across the DC bus and operative to limit voltage ripple across the DC bus.

2. The converter system of claim 1, wherein the first frequency is within or exceeds a range of 20 kHz to 200 kHz.

3. The converter system of claim 1, wherein the first two active switches and/or the second two active switches are gallium nitride (GaN) devices.

4. The converter system of claim 1, further comprising:
   a transformer for each phase;
   a third switching cell for each phase of the AC power signal, each third switching cell including third two active switches coupled in series across the DC bus and forming a third switching cell AC pole therebetween, wherein the third switching cell AC pole is coupled to the transformer for each phase; and
   wherein the third switching cells are operative to switch at a third frequency at least three orders of magnitude greater than the line frequency to convert DC to AC; and
   a rectifier operative to rectify AC to DC for each phase.

5. The converter system of claim 1, further comprising a filter neutral coupled to each phase of the AC power source via a capacitor.

6. The converter system of claim 1, further comprising a chassis ground, wherein the flying neutral is coupled to the chassis ground.

7. The converter system of claim 1, wherein the second switching cell AC poles are coupled directly to each other without any intervening inductors or capacitors to form the flying neutral.

8. The converter system of claim 4, wherein the third frequency is within or exceeds a range of 100 kHz to 1 MHz.

9. The converter system of claim 5, wherein the capacitor is coupled between the common AC pole and the third inductor.

10. The converter system of claim 5, wherein the flying neutral is coupled to the filter neutral.

11. A converter system for converting an AC power signal having one or more phases at a line frequency from an AC power source to a desired power signal for powering a load, comprising:
a DC bus for each phase of the AC power signal;
a first at least two switching cells, each switching cell of the first at least two switching cells including a first pair of active switches coupled in series across the DC bus and second pair of active switches coupled in series across the DC bus; each of the first and second pairs of active switches having a first AC pole formed therebetween, a first inductor being coupled to the first AC pole formed between the first pair of active switches, and a second inductor being coupled to the first AC pole formed between the second pair of active switches, the first and second inductors being jointed together at a common AC pole; each first pair of active switches and second pair of active switches further including a decoupling capacitor coupled directly across each first pair of active switches and second pair of active switches, and a bulk DC link capacitor coupled across the DC bus and operative to limit voltage ripple across the DC bus; and a third inductor coupled between the common AC pole and the AC power source for each phase;
a second at least two switching cells, each switching cell of the second at least two switching cells including a second at least two active switches coupled in series across the DC bus;
and a second AC pole formed between the second at least two active switches, wherein the second AC poles for each of the second at least two switching cells are coupled together and form a flying neutral, and
wherein the first at least two switching cells are operative to switch at a first frequency at least an order of magnitude greater than the line frequency to convert AC to DC;
wherein the second at least two switching cells are operative to switch at a second frequency approximately equal to the line frequency to convert AC to DC.

12. The converter system of claim 11, further comprising a converter stage coupled to the DC bus for each phase of the AC power signal and operative to convert DC to AC.

13. The converter system of claim 11, further comprising a single-phase transformer and a single-phase rectifier for each phase.

14. The converter system of claim 11, wherein the one or more phases is three-phases, further comprising three (3) single-phase transformers in a wye connection or a delta connection, and a three-phase rectifier coupled to the transformers.

15. The converter system of claim 11, wherein the load is a motor.

16. The converter system of claim 12, wherein the converter stage is a half bridge converter.

17. The converter system of claim 12, wherein the converter stage is a full bridge converter.

18. The converter system of claim 12, wherein the converter stage includes an AC output terminal; and wherein the converter stage includes a capacitor in series with an inductor on the AC output terminal.

19. The converter system of claim 12, wherein the converter stage is a parallel resonant converter.

* * * * *